(12) United States Patent
Kawasato et al.

(10) Patent No.: US 7,173,807 B2
(45) Date of Patent: *Feb. 6, 2007

(54) ELECTRIC DOUBLE LAYER CAPACITOR

(75) Inventors: Takeshi Kawasato, Yokohama (JP);
Katsuji Ikeda, Yokohama (JP); Naoki Yoshida, Yokohama (JP); Kazuya Hiratsuka, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/332,375

(22) Filed: Jan. 17, 2006

(65) Prior Publication Data

US 2006/0171101 A1     Aug. 3, 2006

Related U.S. Application Data

(63) Continuation of application No. PCT/JP04/10222, filed on Jul. 16, 2004.

(30) Foreign Application Priority Data

Jul. 17, 2003 (JP) ............................. 2003-276161

(51) Int. Cl.
*H01G 9/00* (2006.01)
*H01G 9/02* (2006.01)

(52) U.S. Cl. ..................... 361/502; 252/62.2
(58) Field of Classification Search ............... 361/502, 361/503–505; 252/62.2
See application file for complete search history.

(56) References Cited

U.S. PATENT DOCUMENTS

| | | | |
|---|---|---|---|
| 4,725,927 A | 2/1988 | Morimoto et al. | |
| 5,754,393 A | 5/1998 | Hiratsuka et al. | |
| 5,888,673 A | 3/1999 | Kawasato et al. | |
| 5,969,936 A | 10/1999 | Kawasato et al. | |
| 6,710,999 B2 | 3/2004 | Kawasato et al. | |
| 6,879,482 B2 | 4/2005 | Kawasato et al. | |
| 2004/0072062 A1* | 4/2004 | Kita et al. ................... | 429/90 |

FOREIGN PATENT DOCUMENTS

| | | |
|---|---|---|
| EP | 1 324 358 | 7/2003 |
| JP | 49-68254 | 7/1974 |
| JP | 62-237715 | 10/1987 |
| JP | 3-203311 | 9/1991 |
| JP | 4-154106 | 5/1992 |
| JP | 4-286108 | 10/1992 |
| JP | 2001-185213 | 7/2001 |
| JP | 2003-187868 | 7/2003 |

* cited by examiner

*Primary Examiner*—Eric W. Thomas
(74) *Attorney, Agent, or Firm*—Oblon, Spivak, McClelland, Maier & Neustadt, P.C.

(57) ABSTRACT

To provide an electric double layer capacitor having a low resistance, a high withstanding voltage and an excellent low-temperature characteristic. This object is achieved by employing, for an electric double layer capacitor having a pair of polarized electrodes and an electrolytic solution capable of forming an electric double layer at the interface with the polarized electrodes, an electrolytic solution containing as an electrolyte a salt represented by the formula 1, and as solvents at least (1) a chain carbonate having at most 5 carbon atoms, (2) sulfolane or its derivative and (3) a fluorobenzene:

Formula 1

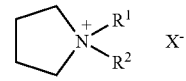

wherein each of $R^1$ and $R^2$ which are independent of each other, is a $C_{1-4}$ alkyl group, and $X^-$ is an anion.

17 Claims, No Drawings

ELECTRIC DOUBLE LAYER CAPACITOR

CROSS REFERENCES TO RELATED APPLICATIONS

This application is a continuation application of International Patent Application No. PCT/JP04/10222, filed on Jul. 16, 2004. This application claims priority to International Patent Application No. PCT/JP04/10222, and to Japanese Patent Application No. 2003-276161, filed on Jul. 17, 2003.

TECHNICAL FIELD

The present invention relates to an electric double layer capacitor. Particularly, it relates to an electric double layer capacitor having a low resistance, a high withstanding voltage and an excellent low-temperature characteristic.

BACKGROUND ART

As a shape of a conventional electric double layer capacitor, there may be a coin type wherein an element having a separator sandwiched between a pair of polarized electrodes composed mainly of activated carbon formed on current collectors, is accommodated together with an electrolytic solution in a metal casing, which is then sealed by a metal cover via a gasket, or a cylindrical type wherein an element having a pair of polarized sheet electrodes wound with a separator interposed therebetween, is accommodated together with an electrolytic solution in a metal casing, which is then sealed so that the electrolytic solution will not evaporate from an opening of the casing.

Further, as one for a large current and large capacitance application, a lamination type electric double layer capacitor has also been proposed wherein an element having many polarized sheet electrodes laminated via a separator disposed therebetween, is incorporated (JP-A-4-154106, JP-A-3-203311, JP-A-4-286108). Namely, rectangular polarized sheet electrodes are used as positive electrodes and negative electrodes, and they are alternately laminated with a separator interposed therebetween, to form an element, which is then accommodated in a casing in such a state that positive electrode lead members and negative electrode lead members are connected by caulking to the terminals of the positive and negative electrodes, respectively, then the element is impregnated with an electrolytic solution, and the casing is closed with a cover.

As an electrolytic solution for a conventional electric double layer capacitor, not only an aqueous electrolytic solution containing a mineral acid such as sulfuric acid, an alkali metal salt or an alkali, but also various organic electrolytic solutions have been used. As the solvent for such organic electrolytic solutions, propylene carbonate, γ-butyrolactone, acetonitrile, dimethyl formamide (JP-A-49-068254) or a sulfolane derivative (JP-A-62-237715), has been known. When the withstanding voltages are compared, the aqueous electrolytic solution has a withstanding voltage of 0.8 V, while the organic electrolytic solution has a withstanding voltage of from 2.5 to 3.3 V. The electrostatic energy of a capacitor corresponds to the square of the withstanding voltage. Accordingly, from the viewpoint of the electrostatic energy, the organic electrolytic solution is more advantageous. However, such a solvent having a high dielectric constant, in which the electrolyte is highly soluble, usually has a high viscosity. Therefore, although an electrolytic solution having a high electrolyte concentration will be obtained, no high electric conductivity will be obtained.

Further, a chain ether, a chain ester, a chain carbonate and the like, which are low viscosity solvents, have a low dielectric constant, whereby substantially no electrolyte will be dissolved therein, and no high electric conductivity will be obtained.

Propylene carbonate which is commonly used as a solvent for an electrolytic solution of an electric double layer capacitor, is a solvent having a high dielectric constant and a relatively not so high viscosity, and is thereby preferably used. However, propylene carbonate may decompose when a voltage of about 2.9 V or higher is applied. Further, electrochemically stable sulfolane has a high withstanding voltage and will not decompose by application of a voltage of up to about 3.4 V, but the electrolyte will hardly soluble in it, and it has a high melting point, and it is particularly poor in low temperature characteristics.

On the other hand, as the electrolyte, a salt comprising as a cation $(C_2H_5)_4N^+$, $(C_2H_5)_4P^+$ or the like having a high electric conductivity has been used. Further, $(C_2H_5)_3(CH_3)N^+$ or the like which is highly soluble in a solvent has been proposed. However, no sufficient solubility in a solvent having a low dielectric constant and a low viscosity has been achieved. Among solvents having a low dielectric constant and a low viscosity, a chain carbonate is electrochemically stable, but in dimethyl carbonate, ethyl methyl carbonate or the like as a single solvent, substantially no electrolyte can be dissolved.

DISCLOSURE OF THE INVENTION

Problems that the Invention is to Solve

The present inventors have proposed as an electrolytic solution to solve the above problems, an electrolytic solution comprising as an electrolyte a chain quaternary ammonium cation represented by $R^aR^bR^cR^dN^+$ (wherein $R^a$ is a n-propyl group, and each of $R^b$, $R^c$ and $R^d$ which are independent of one another, is a methyl group or an ethyl group, provided that two selected from $R^a$ to $R^d$ may together form a tetramethylene group to provide a cyclic pyrrolidinium cation) and as a solvent dimethyl carbonate (U.S. patent application Ser. No. 2003137798). The above cation is electrochemically stable, and an electrolyte comprising the cation is highly soluble in dimethyl carbonate which has a low dielectric constant and a low viscosity.

However, such a phenomenon is observed in the electrolytic solution comprising a dimethyl carbonate solvent in a low electrolyte concentration region, the electrolytic solution undergoes a phase separation into a dimethyl carbonate phase as the solvent and an electrolytic solution phase in which the electrolyte is dissolved. Accordingly, although an electrolytic solution containing an electrolyte at a high concentration has a high electric conductivity and provides excellent durability even after long term use and high reliability for an electric double layer capacitor, a capacitor may not correctly operate in some cases when the electrolytic solution has a low electrolyte concentration. Further, since dimethyl carbonate has a melting point of about 4° C., the capacitor will not operate at a low temperature if the electrolytic solution comprises only dimethyl carbonate as a solvent.

Under these circumstances, it is an object of the present invention to solve the above problems of the prior art and to provide an electric double layer capacitor having a high withstanding voltage, a low resistance and excellent low-temperature characteristics, by studies particularly on the electrolytic solution.

Means of Solving the Problems

The present invention provides an electric double layer capacitor having a pair of polarized electrodes and an electrolytic solution capable of forming an electric double layer at the interface with the polarized electrodes, wherein the electrolytic solution contains as an electrolyte a salt represented by the formula 1, and as solvents at least (1) a chain carbonate having at most 5 carbon atoms, (2) sulfolane or its derivative and (3) a fluorobenzene:

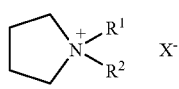

Formula 1 wherein each of $R^1$ and $R^2$ which are independent of each other, is a $C_{1-4}$ alkyl group, and $X^-$ is an anion.

The present invention further provides an electrolytic solution comprising as an electrolyte a salt represented by the above formula 1 (wherein each of $R^1$ and $R^2$ which are independent of each other, is a $C_{1-4}$ alkyl group, and $X^-$ is an anion), and as solvents at least (1) a chain carbonate having at most 5 carbon atoms, (2) sulfolane or its derivative and (3) a fluorobenzene.

The present inventors have conducted extensive studies to achieve the above object and as a result, found that an electrolytic solution having a high electric conductivity without phase separation even in a low concentration region can be obtained by employing sulfolane in addition to a chain carbonate having at most 5 carbon atoms represented by dimethyl carbonate. However, the melting point of sulfolane is 28° C., and such a problem has arisen that low temperature characteristics further deteriorate. They have further found that an electric double layer capacitor having a low resistance and a high withstanding voltage, and excellent low-temperature characteristics can be provided by further employing a fluorobenzene which has a low melting point of −41° C. and which is a low viscosity solvent in addition to the above solvents. The present invention has been accomplished on the basis of these discoveries.

EFFECTS OF THE INVENTION

As described above, the electrolytic solution of the present invention has a low resistance and a high withstanding voltage, and exhibits excellent characteristics such as a low resistance and a high withstanding voltage even in a low temperature region. Accordingly, the electric double layer capacitor of the present invention comprising such an electrolytic solution has a high withstanding voltage and is excellent also in low temperature characteristics.

BEST MODE FOR CARRYING OUT THE INVENTION

The electrolyte in the electrolytic solution of the electric double layer capacitor of the present invention is a pyrrolidinium salt represented by the formula 1. A salt of the formula 1 having a cation with different $R^1$ and $R^2$, which has a high solubility in a solvent and is thereby capable of making the electrolytic solution have a high concentration, is preferred as compared with a salt with the same $R^1$ and $R^2$. A high electric conductivity will be achieved by making the electrolytic solution have a high concentration.

Further, a long carbon chain of the group bonded to the nitrogen atom is preferred in view of increased solubility in a solvent and achievement of a high concentration. On the contrary, if the carbon chain of the group bonded to the nitrogen atom is long, the ionic radius tends to be large, and the electrolyte will be incapable of penetrating into fine pores of the electrode, whereby the amount of ions capable of forming an electric double layer per unit volume tends to be small. Accordingly, the carbon chain is preferably as short as possible from the above viewpoint. Accordingly, among the above pyrrolidinium salts, salts represented by the formulae 2 and 3 are particularly preferred in view of the solubility in a solvent, the amount of ions and the electric conductivity of the solution:

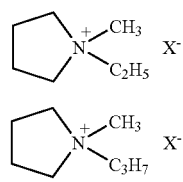

Formula 2

Formula 3

The anion of the electrolyte contained in the electrolytic solution of the electric double layer capacitor of the present invention is preferably an anion selected from the group consisting of $BF_4^-$, $PF_6^-$, $CF_3SO_3^-$ and $(CF_3SO_2)_2N^-$. $BF_4^-$ is particularly preferred in view of the solubility in a solvent, the electric conductivity of the solution, electrochemical stability, etc. Accordingly, among the electrolytes of the present invention, particularly preferred is ethyl methyl pyrrolidinium tetrafluoroborate (hereinafter referred to as $EMPyBF_4$) represented by the formula 4 or methyl propyl pyrrolidinium tetrafluoroborate (hereinafter referred to as $MPPyBF_4$) represented by the formula 5:

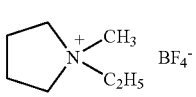

Formula 4

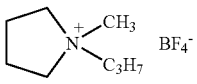

Formula 5

The electrolytic solution of the present invention contains as solvents at least (1) a chain carbonate having at most 5 carbon atoms, (2) sulfolane or its derivative and (3) a fluorobenzene. Specifically, (1) may, for example, be dimethyl carbonate, ethyl methyl carbonate, diethyl carbonate or methyl propyl carbonate. (2) may, for example, be sulfolane or 3-methyl sulfolane. (3) may, for example, be monofluorobenzene, 1,2-difluorobenzene, 1,3-difluorobenzene, 1,4-difluorobenzene, 1,2,3-trifluorobenzene, 1,2,4-trifluorobenzene, 1,3,5-trifluorobenzene, 1,2,3,4-tetrafluorobenzene, 1,2,3,5-tetrafluorobenzene, 1,2,4,5-tetrafluorobenzene, pentafluorobenzene or hexafluorobenzene.

The electrolytic solution may contain as solvents only (1) to (3). However, another solvent may further be added. As such another solvent, a known solvent may be used. It may, for example, be a cyclic carbonate such as propylene carbonate, ethylene carbonate or butylene carbonate, a cyclic lactone such as γ-butyrolactone or γ-valerolactone, a nitrile such as acetonitrile or glutaronitrile, dimethylformamide, 1,2-dimethoxyethane, nitromethane or trimethyl phosphate.

Further, in the present invention, a high electric conductivity will be obtained without phase separation even in a low electrolyte concentration region. Accordingly, a solvent having an extremely low polarity, which cannot be used for a conventional electrolytic solution, can be incorporated in the electrolytic solution.

An electrolytic solution comprising dimethyl carbonate as a solvent in combination with $EMPyBF_4$ is in a single phase at a concentration within a range of from about 2.0 to about 2.9 mol/kg. Its electric conductivity reaches a peak of about 20.9 mS/cm in the vicinity of 2.6 mol/kg, and the electric conductivity will no longer increase even if the concentration is further increased. The electrolytic solution undergoes separation into two phases in a region with a low electrolyte concentration of 1.9 mol/kg or lower. Similarly, an electrolytic solution in combination with $MPPyBF_4$ is in a single phase within a range of from about 1.8 to about 4.2 mol/kg, its electric conductivity reaches a peak of 17.3 mS/cm in the vicinity of 2.6 mol/kg, the electric conductivity will no longer increase even if the concentration is further increased, and the electrolytic solution undergoes separation into two phases in a region with a concentration of 1.7 mol/kg or lower.

On the other hand, when sulfolane or a sulfolane derivative is incorporated in the above electrolytic solution in an amount of from 3 to 36% in the total mass of the solution, the electrolytic solution is in a single phase and has a high electric conductivity in the entire concentration range. Further, as the melting points of dimethyl carbonate and sulfolane are about 3° C. and 28° C., respectively, performance of the above electrolytic solution tends to deteriorate in a low temperature region. However, when a fluorobenzene which has a melting point of about −41° C. and which is a low viscosity solvent is incorporated in an amount of from 3 to 36%, the electric conductivity in a low temperature region is remarkably improved. The same applies to cases where the other electrolytes represented by the formula 1 are used.

Further, if the concentration of the electrolyte is too high, an ammonium salt as the electrolyte may be deposited under cold conditions, thus decreasing the stability, and if the concentration is too low, the internal resistance tends to increase. Accordingly, the concentration of the electrolyte is preferably from 0.5 to 2.5 mol/kg when $EMPyBF_4$ is used, and from 0.5 to 3.0 mol/kg when $MPPyBF_4$ is used. The electrolyte concentration is particularly preferably from 1.0 to 2.0 mol/kg and 1.0 to 2.5 mol/kg, respectively. In terms of the mass ratio, the proportion of the electrolyte in the total mass of the electrolytic solution is preferably from 10 to 60% with respect to all the electrolytes represented by the formula 1.

On the other hand, dimethyl carbonate is contained preferably in an amount of from 25 to 84% in the total mass of the electrolytic solution. If the proportion of the dimethyl carbonate is less than 25%, the solubility of the electrolyte tends to decrease, and the concentration of the electrolyte may not sufficiently be high. Accordingly, as the composition of the electrolytic solution of the present invention, it is preferred that the electrolyte is contained in an amount of from 10 to 60%, dimethyl carbonate from 25 to 84%, sulfolane from 3 to 36% and the fluorobenzene from 3 to 36% by the mass ratio based on the total mass of the electrolytic solution.

Further, the electrolytic solution of the present invention is an organic electrolytic solution, preferably contains metal impurities and water as little as possible. Usually, one having a water content of at most 10 ppm is preferably employed.

The polarized electrodes to be used for the electric double layer capacitor of the present invention may be ones made mainly of an electrochemically inactive material having a high specific surface area, specifically those made mainly of activated carbon, carbon black, fine metal particles or fine electrically conductive oxide particles. Among them, it is preferred to use those having an electrode layer comprising a powder of carbon material having a high specific surface area such as activated carbon, formed on the surface of metal current collectors.

Specifically, the electrode layer is formed preferably by using, as the main component, a powder of carbon material such as activated carbon or polyacene having a large specific surface area (specific surface area: about 200 to 3,000 $m^2/g$), adding thereto carbon black, acetylene black, Ketjenblack or carbon whisker as a conductive material, and polytetrafluoroethylene, polyvinylidene fluoride, carboxymethylcellulose or the like as a binder, kneading the mixture in the presence of a liquid lubricant such as an alcohol, molding the mixture into a sheet e.g. by rolling, followed by drying to obtain a sheet-form molded product, which is bonded by heat pressing or bonded by means of an electrically conductive adhesive or the like to both sides of a metal current collector.

Further, instead of kneading, a solvent capable of dissolving the above binder or a solvent mixture containing such a solvent (water, N-methylpyrrolidone, etc.) may be mixed with activated carbon, a conductive material and a binder to obtain a slurry, which may be coated on both sides of a metal current collector and dried to form the electrode layer. The thickness of such an electrode layer is not particularly limited, but is usually from about 10 μm to 0.5 mm.

As the activated carbon material, one derived from a natural plant tissue such as coconut shell, a synthetic resin such as a phenolic resin or a fossil fuel such as coal, coke or pitch, may be employed. As an activating method for activated carbon, steam activation or alkali activation (particularly activation by KOH) may be applied, although it may vary depending upon the raw material to be employed. Activated carbon derived from a natural plant tissue or a fossil fuel, contains a relatively large amount of metal impurities, and accordingly, washing with e.g. an acid is usually required. Similarly, activated carbon obtained by alkali activation contains a large amount of an alkali metal used for the activation or metal impurities brought from an activation apparatus due to the reaction with the alkali, and accordingly a washing operation will be required. Among them, steam activated carbon made of a synthetic resin as a raw material, is most preferred from the viewpoint of metal impurities.

The element construction of the electric double layer capacitor of the present invention is not particularly limited, and the present invention can be applied to any one of a coin type structure, a cylindrical structure or a prismatic structure. For example, the coin type structure may be formed in such a manner that an element is formed by forming electrode layers composed mainly of activated carbon provided on current collectors and disposing a separator between a pair of electrodes, and the element is, together with an electrolytic solution, sealed in a coin type metal casing by a metal cover and a gasket which insulates both.

Whereas, the cylindrical structure is, for example, the following structure. A band-like positive electrode having an electrode layer composed mainly of e.g. activated carbon formed on both sides of a metal current collector and a band-like negative electrode having an electrode layer of the same construction formed on both sides of a metal current collector, are alternately laminated via a band-like separator and wound to obtain a wound element. The element is accommodated in a cylindrical metal casing and impregnated with the electrolytic solution, whereupon the current collecting leads taken out from the positive electrode and the negative electrode, respectively, are connected, respectively, to the electrode terminals provided, for example, on an electrically insulating sealing cover, and the sealing cover is fit to the metal casing to form a cylindrical structure.

The prismatic structure is, for example, the following structure. Electrode layers are formed on both sides of a rectangular metal current collector, and a plurality of positive electrodes and a plurality of negative electrodes, each provided with a current collecting lead, are alternately laminated via a separator, to form a laminated element having current is collecting leads taken out. The element is accommodated in a prismatic metal casing and impregnated with an electrolytic solution, whereupon a sealing cover is fit on the prismatic casing to form a prismatic structure.

The current collector may be made of any metal so long as it is electrochemically or chemically corrosion resistant. In the case of a coin type structure, the housing member such as the metal sealing cover or the metal casing, may serve as a current collector, in many cases. As the current collector in the case of the cylindrical structure or the prismatic structure, it is preferred to employ a surface-roughened foil or net made of a metal such as aluminum, stainless steel, nickel or tantalum, particularly a foil or net made of a stainless steel, aluminum or an alloy containing it. More preferred as the metal current collector is an aluminum foil having a purity of 99.9%, particularly preferably 99.99%. In the present invention, it is preferred to employ a metal current collector made of such a metal foil and having a thickness of from 10 µm to 0.5 mm.

In the case of a cylindrical structure or a prismatic structure, current collecting leads will be provided to the metal current collectors. It is preferred to provide a tape-or ribbon-shaped portion on a current collector having no electrode layer formed thereon and to bond an electrically conductive tab terminal, wire, tape, ribbon or the like by e.g. welding to such a portion to form a current collecting lead. Otherwise, a portion having no electrode layer formed, is provided at a part of a current collector, so that such a portion may be used as a current collecting lead. Specifically, for example, in the case of a cylindrical structure, a strip portion having no electrode layer formed, may be provided along one end in the longitudinal direction of a band-like current collector, and the counter electrode is overlaid via a separator so that the strip portion is located at the opposite end, and the assembly is wound to obtain an element, whereby both end surfaces (the above strip portions) of the element can be used as current collecting leads.

The separator of the present invention is not particularly limited, so long as it is a porous separator through which ions can permeate. A fine porous polyethylene film, a fine porous polypropylene film, a polyethylene non-woven fabric, a polypropylene non-woven fabric, a polypropylene non-woven fabric, a glass fiber incorporated non-woven fabric, a glass mat, cellulose paper, kraft pulp, sisal hemp or Manila hemp, may, for example, be preferably employed. The thickness of the separator is preferably from 20 to 200 µm, particularly preferably from 30 to 100 µm. From the viewpoint of the absorptivity for the electrolytic solution and the internal resistance, the higher the porosity, the better. However, as the porosity is high, defects such as pinholes are likely to increase, thus leading to self discharge failure. Accordingly, the porosity is usually preferably within a range of from 50 to 90%, more preferably within a range of from 60 to 85%.

EXAMPLES

Now, the present invention will be described in further detail with reference to Examples of the present invention (Examples 1 and 2) and Comparative Examples (Examples 3 to 5). However, it should be understood that the present invention is by no means restricted by such specific Examples.

Example 1

Ethanol was added to a mixture comprising a phenolic resin type activated carbon having a specific surface area of 2,000 $m^2/g$ activated by steam, polytetrafluoroethylene and carbon black in a mass ratio of 8:1:1, and the mixture was kneaded and formed into a sheet. This was rolled in a thickness of 0.6 mm to obtain an electrode sheet, which was punched into disks having a diameter of 12 mm.

Such disk-shaped electrodes were bonded to the positive electrode side and negative electrode side insides, respectively, of a stainless steel casing serving as a current corrector and housing member for a coin-shaped cell by means of a graphite type conductive adhesive. Then, the entire assembly including the stainless steel casing was subjected to heat treatment under reduced pressure to remove water, etc. The electrodes were impregnated with an electrolytic solution having 2.0 mol/kg of $EMPyBF_4$ dissolved in a solvent mixture comprising dimethyl carbonate, sulfolane and monofluorobenzene in a mass ratio of 56:24:20. A separator (thickness: 160 µm, porosity: 70%) of a non-woven fabric made of polypropylene fiber was sandwiched between the two electrodes, and the stainless steel casing was caulked via a gasket as an insulator and sealed, to obtain a coin-shaped electric double layer capacitor having a diameter of 18.4 mm and a thickness of 2.0 mm.

Example 2

A coin-shaped electric double layer capacitor was obtained in the same manner as in Example 1 except that as the electrolytic solution, a solution having 1.0 mol/kg of $MPPyBF_4$ dissolved in a solvent mixture comprising dimethyl carbonate, sulfolane and monofluorobenzene in a mass ratio of 64:16:20, was used.

Example 3 (Comparative Example)

A coin-shaped electric double layer capacitor was obtained in the same manner as in Example 1 except that as the electrolytic solution, a solution having 2.0 mol/kg, of $EMPy^+BF_4^-$ dissolved in dimethyl carbonate was used.

Example 4 (Comparative Example)

A coin-shaped electric double layer capacitor was obtained in the same manner as in Example 1 except that as the electrolytic solution, a solution having 2.0 mol/kg of $EMPyBF_4$ dissolved in a solvent mixture comprising dimethyl carbonate and sulfolane in a mass ratio of 70:30, was used.

Example 5 (Comparative Example)

A coin-shaped electric double layer capacitor was obtained in the same manner as in Example 1 except that as the electrolytic solution, a solution having 1.0 mol/kg of $EMPyBF_4$ dissolved in a solvent mixture comprising dimethyl carbonate and sulfolane in a mass ratio of 80:20, was used.

Measurement of Characteristics of Electric Double Layer Capacitor

Then, a voltage of 3.3 V was applied at 25° C. to each of the electric double layer capacitors obtained in Examples 1 to 5, whereby the capacitance and the initial internal resistance were measured. Further, the capacitance and the internal resistance at −25° C. were measured, and the results are shown in Table 2. Characteristics of the electric double layer capacitors in Comparative Examples at a low temperature could not be measured, whereby the capacitors were confirmed to be unusable at such a low temperature as −25° C.

TABLE 1

| | Compositional ratio (mass %) | Concentration (mol/kg) | Solubility | Electric conductivity (mS/cm) 25° C. | Electric conductivity (mS/cm) −25° C. |
|---|---|---|---|---|---|
| $EMPyBF_4$ | 20.1 | 1.0 | Dissolved | — | — |
| Dimethyl carbonate | 79.9 | | Separated into two phases | | |
| $EMPyBF_4$ | 40.2 | 2.0 | Dissolved | 16.0 | Frozen |
| Dimethyl carbonate | 59.8 | | Single phase | | |
| $EMPyBF_4$ | 20.1 | 1.0 | Dissolved | 11.2 | Frozen |
| Dimethyl carbonate | 55.9 | | Single phase | | |
| Sulfolane | 24.0 | | | | |
| $EMPyBF_4$ | 40.2 | 2.0 | Dissolved | 17.5 | Frozen |
| Dimethyl carbonate | 41.9 | | Single phase | | |
| Sulfolane | 17.9 | | | | |
| $EMPyBF_4$ | 20.1 | 1.0 | Dissolved | 10.0 | 1.4 |
| Dimethyl carbonate | 44.7 | | Single phase | | |
| Sulfolane | 19.2 | | | | |
| Monofluorobenzene | 16.0 | | | | |
| $EMPyBF_4$ | 40.2 | 2.0 | Dissolved | 15.9 | 3.3 |
| Dimethyl carbonate | 33.5 | | Single phase | | |
| Sulfolane | 14.3 | | | | |
| Monofluorobenzene | 12.0 | | | | |
| $MPPyBF_4$ | 21.5 | 1.0 | Dissolved | — | — |
| Dimethyl carbonate | 78.5 | | Separated into two phases | | |
| $MPPyBF_4$ | 21.5 | 1.0 | Dissolved | 10.0 | Frozen |
| Dimethyl carbonate | 62.8 | | Single phase | | |
| Sulfolane | 15.7 | | | | |
| $MPPyBF_4$ | 21.5 | 1.0 | Dissolved | 9.9 | 1.2 |
| Dimethyl carbonate | 50.2 | | Single phase | | |
| Sulfolane | 12.6 | | | | |
| Monofluorobenzene | 15.7 | | | | |
| $Et_3MeNBF_4$ | 20.3 | 1.0 | Deposited | — | — |
| Dimethyl carbonate | 79.7 | | | | |
| $Et_3MeNBF_4$ | 20.3 | 1.0 | Deposited | — | — |
| Dimethyl carbonate | 55.8 | | | | |
| Sulfolane | 23.9 | | | | |
| $Et_3MeNBF_4$ | 20.3 | 1.0 | Deposited | — | — |
| Dimethyl carbonate | 44.7 | | | | |
| Sulfolane | 19.1 | | | | |
| Monofluorobenzene | 15.9 | | | | |
| $Et_3MeNBF_4$ | 20.3 | 1.0 | Dissolved | 14.0 | 2.0 |
| Propylene carbonate | 79.7 | | Single phase | | |

Solubility of Electrolyte in Solvent and Electric Conductivity

First, solubilities of the electrolytes in solvents used in Examples and Comparative Examples were confirmed. With respect to the electrolytic solutions in which the electrolyte could be dissolved, the electric conductivities of the solutions at 25° C. and at −25° C. were measured, and the results are shown in Table 1. As evident from Table 1, the electrolytes of the present invention were dissolved without separation into two phases even in a low concentration region, and high electric conductivities were achieved without freezing in a low temperature region. In Table 1, $Et_3MeNBF_4$ represents triethyl monomethyl ammonium tetrafluoroborate.

TABLE 2

| | 25° C. Capacitance (F) | 25° C. Internal resistance (Ω) | −25° C. Capacitance (F) | −25° C. Internal resistance (Ω) |
|---|---|---|---|---|
| Ex. 1 | 2.84 | 8.8 | 2.20 | 34.0 |
| Ex. 2 | 2.73 | 10.4 | 1.91 | 47.0 |
| Ex. 3 | 2.82 | 8.7 | — | — |
| Ex. 4 | 2.85 | 8.3 | — | — |
| Ex. 5 | 2.71 | 10.7 | — | — |

INDUSTRIAL APPLICABILITY

The electrolytic solution of the present invention has a low resistance, a high withstanding voltage and an excellent low-temperature characteristic. Accordingly, according to the present invention, an electric double layer capacitor providing a low resistance, a high withstanding voltage and an excellent low-temperature characteristic can be provided.

The entire disclosure of Japanese Patent Application No. 2003-276171 filed on Jul. 17, 2003 including specification, claims, and summary is incorporated herein by reference in its entirety.

What is claimed is:

1. An electric double layer capacitor comprising a pair of polarized electrodes and an electrolytic solution which forms an electric double layer at the interface with the polarized electrodes, wherein the electrolytic solution comprises as an electrolyte a salt of Formula 1, and comprises as solvents at least (1) a chain carbonate comprising at most 5 carbon atoms, (2) sulfolane or its derivative and (3) a fluorobenzene:

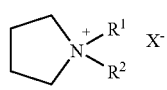

Formula 1 wherein each of $R^1$ and $R^2$ which are independent of each other, is a $C_{1-4}$ alkyl group, and $X^-$ is an anion.

2. The electric double layer capacitor according to claim 1, wherein the electrolyte is a salt of Formula 2 or Formula 3:

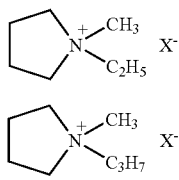

Formula 2

Formula 3

3. The electric double layer capacitor according to claim 2, wherein, $X^-$ is an anion selected from the group consisting of $BF_4^-$, $PF_6^-$, $CF_3SO_3^-$ and $(CF_3SO_2)_2N^-$.

4. The electric double layer capacitor according to claim 2, wherein the chain carbonate is dimethyl carbonate.

5. The electric double layer capacitor according to claim 2, wherein the fluorobenzene in the electrolytic solution is monofluorobenzene.

6. The electric double layer capacitor according to claim 2, comprising
the electrolyte in an amount of from 10 to 60%,
dimethyl carbonate in an amount of from 25 to 84%,
sulfolane in an amount of from 3 to 36%, and
the fluorobenzene in an amount of from 3 to 36%, in the total mass of the electrolytic solution.

7. The electric double layer capacitor according to claim 6, wherein the fluorobenzene in the electrolytic solution is monofluorobenzene.

8. The electric double layer capacitor according to claim 1, wherein in the Formula 1, $X^-$ is an anion selected from the group consisting of $BF_4^-$, $PF_6^-$, $CF_3SO_3^-$ and $(CF_3SO_2)_2N^-$.

9. The electric double layer capacitor according to claim 8, wherein the electrolyte is represented by Formula 4 or Formula 5:

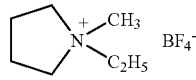

Formula 4

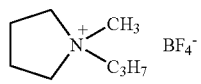

Formula 5

10. The electric double layer capacitor according to claim 1, wherein the chain carbonate is dimethyl carbonate.

11. The electric double layer capacitor according to claim 10, comprising
the electrolyte in an amount of from 10 to 60%,
dimethyl carbonate in an amount of from 25 to 84%,
sulfolane in an amount of from 3 to 36%, and
the fluorobenzene in an amount of from 3 to 36%, in the total mass of the electrolytic solution.

12. The electric double layer capacitor according to claim 1, wherein the fluorobenzene in the electrolytic solution is monofluorobenzene.

13. An electrolytic solution comprising as an electrolyte a salt of Formula 1, and as solvents at least (1) a chain carbonate comprising at most 5 carbon atoms, (2) sulfolane or its derivative and (3) a fluorobenzene:

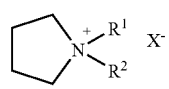

Formula 1 wherein each of $R^1$ and $R^2$ which are independent of each other, is a $C_{1-4}$ alkyl group, and $X^-$ is an anion.

14. The electrolytic solution according to claim 13, wherein the electrolyte is represented by the formula 4 or 5:

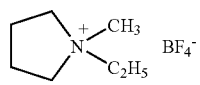

Formula 4

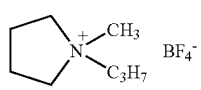

Formula 5

15. The electrolytic solution according to claim 13, wherein the chain carbonate is dimethyl carbonate.

16. The electrolytic solution according to claim 13, wherein the fluorobenzene in the electrolytic solution is monofluorobenzene.

17. The electrolytic solution according to claim 13, comprising
the electrolyte in an amount of from 10 to 60%,
dimethyl carbonate in an amount of from 25 to 84%,
sulfolane in an amount of from 3 to 36%, and
the fluorobenzene in an amount of from 3 to 36%, in the total mass of the electrolytic solution.

* * * * *

UNITED STATES PATENT AND TRADEMARK OFFICE
CERTIFICATE OF CORRECTION

| | | |
|---|---|---|
| PATENT NO. | : 7,173,807 B2 | Page 1 of 1 |
| APPLICATION NO. | : 11/332375 | |
| DATED | : February 6, 2007 | |
| INVENTOR(S) | : Kawasato et al. | |

It is certified that error appears in the above-identified patent and that said Letters Patent is hereby corrected as shown below:

On the title page, Item (30) the Foreign Application Priority Data information is incorrect. Item (30) should read:

Item -- (30)   Foreign Application Priority Data

Jul. 17, 2003    (JP) ..................... 2003-276171 --

Signed and Sealed this

Tenth Day of April, 2007

JON W. DUDAS
*Director of the United States Patent and Trademark Office*